US005923412A

United States Patent [19]

Ertel

[11] Patent Number: 5,923,412

[45] Date of Patent: Jul. 13, 1999

[54] ENCAPSULATED LIQUID TONER PRINTING APPARATUS

[75] Inventor: John P. Ertel, Portola Valley, Calif.

[73] Assignee: Hewlett-Packard Company, Palo Alto, Calif.

[21] Appl. No.: 08/725,597

[22] Filed: Oct. 3, 1996

[51] Int. Cl.[6] .......... G03B 27/00

[52] U.S. Cl. .......... 355/400; 355/406; 430/138

[58] Field of Search .......... 355/400, 402, 355/406; 430/138

[56] References Cited

U.S. PATENT DOCUMENTS

| | | | |
|---|---|---|---|
| 3,917,880 | 11/1975 | Wells et al. . | |
| 4,801,949 | 1/1989 | Misono et al. . | |
| 5,013,629 | 5/1991 | Sekine et al. | 430/138 |
| 5,060,020 | 10/1991 | Sakai | 399/223 |
| 5,108,867 | 4/1992 | Wing, Jr. et al. | 430/138 |
| 5,353,094 | 10/1994 | Kagayama . | |
| 5,428,435 | 6/1995 | Yasuda et al. . | |
| 5,463,454 | 10/1995 | Yasuda et al. . | |

FOREIGN PATENT DOCUMENTS

| | | | |
|---|---|---|---|
| 19717651 | 4/1997 | Germany | B41M 5/125 |
| 58-126542 | 7/1983 | Japan . | |
| 62-090686 | 4/1987 | Japan . | |
| 63-088033 | 4/1988 | Japan . | |
| 2262159 | 10/1990 | Japan . | |
| 4-000479 | 1/1992 | Japan . | |
| 4-078436 | 3/1992 | Japan . | |
| 4-249194 | 9/1992 | Japan . | |
| 4-253779 | 9/1992 | Japan . | |
| 5-273852 | 10/1993 | Japan . | |
| 2504825 | 6/1996 | Japan . | |

OTHER PUBLICATIONS

Arthur S. Diamond, "Handbook of Imaging Materials", TR196.H36 199, pp. 565–567.

*Primary Examiner*—Robert Beatty
*Attorney, Agent, or Firm*—Brian R. Short

[57] ABSTRACT

An encapsulated liquid toner apparatus and method for printing. The encapsulated liquid toner apparatus and method for printing operates by selectively depositing ink filled microcapsules to a print medium. The microcapsules have a mixture of pigment particles, drying agents, and an ester oil contained within a hard brittle outer shell. The outer shell formed from a urea resoricnol formaldehyde material is crushed which releases ink within the microcapsule onto the print medium. One embodiment of the invention deposits the microcapsules on the print medium through an electrophotographic process. Another embodiment deposits the microcapsules through a toner ejection process.

2 Claims, 6 Drawing Sheets

ENCAPSULATED LIQUID TONER PRINTING APPARATUS

FIELD OF INVENTION

This invention relates generally to an apparatus and method for printing. In particular, it relates to a printing apparatus and method in which liquid toner microcapsules are used to transfer ink from a reservoir to a print medium.

BACKGROUND

Electrophotography (laser printing) is a technology often used in printers which are connected to computer systems. Laser printers are popular because of their fast image printing speed. Comparatively, laser printers print images much faster than ink jet printers. However, the color quality of color images printed by laser printers using dry toner is not as high as the color quality of color images printed by ink jet printers.

The color quality of laser printers suffers because of the physical characteristics of the dry toner used in laser printers. The color quality is limited in part by the useable size (greater than 7 $\mu$m in diameter) of the particles of the dry toner. Dry particles much smaller than 7 $\mu$m in diameter are preferred for color, but tend to act like dust or smoke particles which do not settle if disturbed. The unsettled particles are generally considered to be a health hazard. Furthermore, dry toner particles do not work well as light filters because of the relative size of the particles compared to the wavelength of visible light.

Attempts have been made to reduce the useable size of the dry toner particles by suspending the particles within a liquid toner bath. Liquid electrophotography (LEP) uses toner particles less than 0.1 micrometers in size and an electrophoretic process to transport the particles through the liquid. Electrophoresis requires the liquid to be non-conductive and have a low viscosity. Generally, the optimal liquids for particle suspension tend to be hydrocarbon oils. Hydrocarbon oils, however, have some basic useability problems. The liquid oils can be prone to spillage, can emit undesirable vapors into the air, and under certain circumstances are flammable. The liquid toners must have a low viscosity for high toner mobility. Therefore, the toners usually have a very low solid colorant content of about 2% by volume.

An advantage of LEP is that liquid toner inks contain very small pigment particles. The size of the particles is very close to the wavelengths of the light being filtered by the particles. The particles act as semi-transparent light filters and subtract light of certain wavelengths from the otherwise white light reflecting from white paper on which the ink is deposited. In comparison, the large particles in dry toner scatter light because of the large physical size of the particles compared to the wavelengths of incident light. Furthermore, larger particles reflect light at air voids formed between multiple toner particles. The reflected light is uncolored by the particles and appears as “white” light which de-saturates the intended color. In contrast, liquid inks with pigment particles less than 0.1 micrometers in diameter can provide high color strength and color quality. The pigment particles generally include the primary colors of cyan, yellow, magenta and black. These primary colors can be mixed to accurately produce all other visible colors. In contrast, the scattered light resulting from dry toner desaturates and lowers the luminance value of the colors printed. This gives the dry toner prints a smaller color gamut.

Ink jet printers offer certain advantages over LEP printers. Ink jet printers hold ink in foam sponges inside pens that are not prone to spillage. The liquid solvent used for the inks is water. Water is not flammable and is not a source of undesirable vapors. Therefore, the release of water into the room air surrounding an ink jet printer is not as great an issue as when hydrocarbon oils are released into the air surrounding an LEP printer.

Many ink jet inks, however, contain dyes instead of pigments. Dyes are similar to pigments but are composed of free molecules of colorant dissolved in a carrier fluid. The dye molecules are smaller than the approximately 0.1 $\mu$m diameter pigment particles and provide good color strength. Dye molecules, however, are susceptible to fading after prolonged exposure to light. Pigment particles are more colorfast but can cause nozzle orifices to clog in ink jet applications.

Ink jet printers usually print much slower than laser printers. Ink jet printers transport ink to a print medium through nozzles which are connected to chambers which hold the ink. Ink jet ink comprises mostly water to facilitate formation of an expanding steam bubble which ejects an ink drop. Usually, the colorant concentration of the ink is limited to about 2%–5%. Therefore, the printing operation transfers a relatively large amount of water to the print medium. Above a certain printing speed, water is applied faster than the print medium can absorb it. As a result, the ink will puddle. The puddles can run together, reducing the definition of the printed images and blending the ink, forming incorrect colors. Paper fibers also swell due to absorbed water causing a distortion known as cockle which detracts from the appearance of the finished print.

U.S. Pat. No. 5,108,867 proposes another method of depositing ink on a print medium. The print medium in which an image is to be formed is coated with a uniform layer of a dry developer chemical. The print medium is then uniformly coated with a mix of three different types of microencapsulated photohardenable toner particles. The three different photohardenable toner particles each contain one of three colors of clear liquid leuco dyes, each color within a different microcapsule shell. Each of the three different photohardenable toner leuco dyes harden when exposed to light of a certain wavelength. An image is created by imagewise hardening select photohardenable toner particles and then crushing all the toner particles on the print medium releasing the leuco dyes within the unhardened toner particles onto the print medium. The leuco dyes from unhardened capsules mix with the developer on the print medium and form a primary color. The dyes from hardened capsules cannot mix with the developer and have no color effect. For example, if the color red is to be formed on a region of a print medium, the medium is exposed to red light. The red light causes the photohardenable capsules containing the leuco dye for the color yellow to harden. The unhardened photohardenable toner particles containing cyan and magenta leuco dyes are crushed which releases the dyes onto the print medium. The resulting cyan and magenta colors mix forming a region of red on the print medium. An undesirable feature of this method is that the medium must be uniformly coated with the developer chemical and substantially covered with a mixture of all three photohardenable toner particles rather than only depositing the photo hardenable particles where ink is to be deposited on the medium. Another undesirable feature is that a plurality of light sources are required to provide light having the wavelengths required to harden the desired photohardenable toner particles.

Existing electrophotographic printer technologies require a heat fuser for bonding toner to a print medium after the toner has been deposited on the print medium. Heat fusers are undesirable for several reasons. Firstly, heat fusers dissipate energy. Many heat fusers dissipate energy the entire time that the associated printer is powered even if the printer is not actively printing. Secondly, heat fusers require a warm-up period before the heat fuser can be used. Therefore, a period of time is required between the point in time that the printer is turned on and the point in time at which one can create a print. Thirdly, the heat fuser transfers energy to the print medium to dry the ink deposited on the print medium. Print speed can be limited by the rate at which heat can be transferred to the print medium.

U.S. Pat. Nos. 5,463,454 and 5,428,435 propose methods of printing images in which the heat fusers operate at lower temperatures than required by other types of printers. However, even at a reduced temperature, the same limitations associated with heat fusers still exist.

It would be desirable to have a toner, apparatus and method of printing which is quick and which prints high quality color images. The desired toner, apparatus and method would not suffer from the environmental and health concerns of the above mentioned methods. Furthermore, the desired apparatus and method would be simple, would not require a heat fuser, would only deposit ink where required to form the desired image, and would not require special coated paper.

SUMMARY OF THE INVENTION

The present invention provides an image printing toner, apparatus and method that provides the speed of an electrostatic printer system while maintaining the high quality color images of ink jet printers. This printing apparatus and method does not suffer from the environmental concerns of other existing printing systems and provides improved permanence as compared to ink jet printers. Furthermore, this printing apparatus does not require a heat fuser and is substantially compatible with existing electrostatic printer processes.

A first embodiment of this invention includes a printing system having a microcapsule. The microcapsule includes a dry outer shell. The microcapsule further includes a mixture of pigment particles suspended within a liquid, wherein the mixture is contained within the dry outer shell.

A second embodiment of this invention includes a printing system having a plurality of ink filled microcapsules. This embodiment further includes depositing the microcapsules in an image-wise pattern on a print medium. A pressure fuser assembly crushes the microcapsules deposited on the print medium thereby releasing the ink within the microcapsules on the print medium. The microcapsules have hard outer shells which are substantially transparent and have no effect on the image formed by the liquid ink.

A third embodiment of this invention is similar to the second embodiment but further includes a roller having a uniformly charged photoconductive surface. The roller is rotated and an exposure system selectively exposes portions of the photoconductive surface to a ray of light thereby discharging the portions of the photoconductive surface exposed to the light. A developer system holds electrostatically charged ink filled microcapsules and provides contact between the microcapsules and the photoconductive surface thereby allowing the charged microcapsules to be transferred onto only the discharged portions of the photoconductive surface. A transport assembly receives the print medium and provides contact between the print medium and the electrostatic surface thereby transferring the developed microcapsules onto the surface of the print medium.

Other aspects and advantages of the present invention will become apparent from the following detailed description, taken in conjunction with the accompanying drawings, illustrating by way of example the principles of the invention.

DETAILED DESCRIPTION

Figure 1:
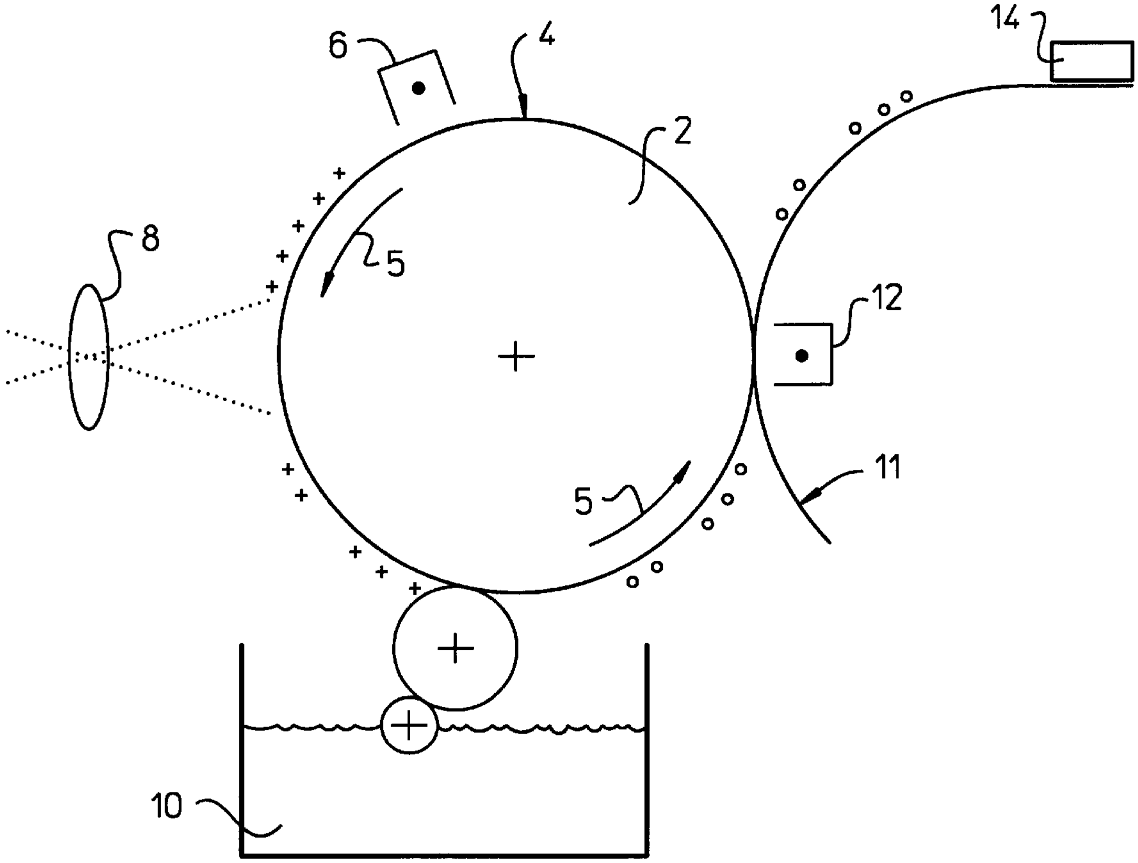
Figure 1 (PRIOR ART)
FIG. 1 shows a prior art electrophotographic printer system.

As shown in the drawings for purposes of illustration, the invention is embodied in a microencapsulated liquid toner. Furthermore, the invention is embodied in an apparatus and method for printing images. This invention provides better quality color prints than can be achieved with dry toner laser printers. Furthermore, the apparatus does not require a heat fuser.

An embodiment of the a printing apparatus according to the invention is in some respects similar to presently existing laser printer systems. However, there is a fundamental difference which substantially improves the color quality of color prints produced by the system of this invention compared with those produced by existing laser printers. Laser printers use dry toners which contain particles that are undesirable for several previously mentioned reasons. This invention replaces conventional dry toner particles with electrostatically charged, ink filled microcapsules. This invention does not require a heat fuser. Therefore, this invention offers advantages over presently existing single color ink printers.

FIG. 1 shows a prior art electrophotographic printer system. Typically, the printer system includes a roller 2 having a photoconductive surface 4. The roller rotates in the direction indicated by the arrows 5. As the roller 2 rotates, a uniform charger 6 charges the photoconductive surface 4 of the roller 2. An imagewise discharger 8 discharges select regions of the photoconductive surface 4 which correspond to the image to be printed. As the roller 2 further rotates, electrostatically charged dry toner 10 is transferred to the discharged regions of the photoconductive surface 4. As the roller 2 further rotates, the transferred dry toner on the photoconductive surface 4 is pressed in contact with a piece of paper 11. An electrostatic bias 12 may be used to aid the transfer of the dry toner to the paper 11. The transferred dry toner creates an image on the paper 11. A heat fuser 14 heats and applies a small amount of pressure upon the toner transferred to the paper 11. The heat helps soften the toner so that heat fusing can occur at a relatively low pressure.

As was previously described, the color quality of the image formed on the paper is limited in quality by the size of the particles of the dry toner 10. The present invention improves the quality of printed images by replacing the particles of dry toner 10 with ink filled microcapsules.

Figure 2:
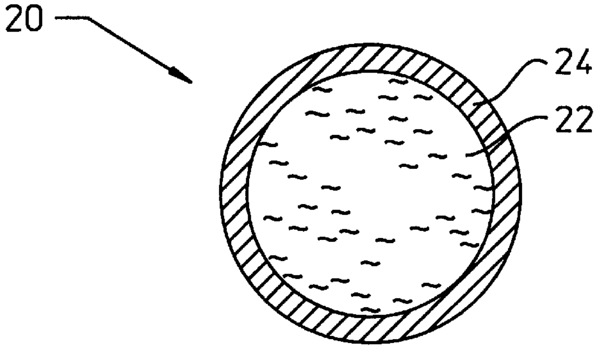
FIG. 2 shows a microcapsule according to the invention.

FIG. 2 shows an embodiment of a microcapsule 20 of this invention. The microcapsule includes liquid ink 22 which is encapsulated within a dry shell 24. The shell 24 has a dry outer surface which may be hard or flexible. Furthermore, the shell is usually thin in comparison to the diameter of the microcapsule 20. The liquid ink is a simple two-component mixture. More than two components may be used for improved ink quality. Pigment particles of a desired color and having a diameter of about 0.1 $\mu$m are suspended in a liquid carrier. The liquid is preferably a colorless oil which suspends the colorant particles and does not rapidly diffuse through the capsule wall. The oil is typically an ester oil that is non-volatile and environmentally benign. The pigment concentration is preferably 20%–30% by volume in the oil so that a comparatively small amount of liquid is included in the ink relative to the amount of liquid included in ink jet ink or traditional liquid electrophotography ink. The dry shell 24 can carry an electrostatic charge. Therefore, the microcapsule 20 can be delivered to a piece of paper in much the same fashion that a laser printer delivers particles of dry toner to a piece of paper. Once on the paper, the microcapsules 20 are crushed. The liquid ink 22 within the microcapsules 20 is released onto the paper when the microcapsules are crushed. The microcapsule shells comprise about 10%–20% of the entire pre-crushed microcapsule and the crushed microcapsule shells have very little effect on the resulting printed image.

Microencapsulation is a well-developed technology which has been used to produce carbonless copy paper and time-release drugs. The wall material of the shell 24 is preferably a urea resorcinol formaldehyde material. However, the wall material may be any material typically used in microencapsulation as long as the microcapsule can contain a liquid core and can sustain a electrostatic charge. The shell 24 is capable of holding the ink 22 within the microcapsule 20. However, the shell 24 is brittle so that when a selected pressure force is applied the shell 24 breaks and releases the ink 22 contained within the microcapsule 20.

The microcapsules can be formed by one of several known processes such as coacervation. More specifically, the microcapsules can be formed as described by Arthur S. Diamond (*Handbook of Imaging Materials*: Marcel Dekker, Inc., pages 565–567,1991). An oil and pigment suspension is prepared in a first tank. A second tank contains the water phase, consisting of water and various emulsion-stabilizing agents such as water-soluble polymers and surfactants. With high-shear mixing, the oil phase is slowly added to the water phase until oil-in-water emulsion is obtained. Next, melamine, urea, and formalin are added to the emulsion. Condensation occurs at the oil-water interface, leading to a polymer, which forms around the surface of the oil droplets. During a curing period, further condensation and crosslinking at this interface lead to a discrete microcapsule wall.

The term encapsulation has been used in dry toner technology to refer to an outer layer of material which completely surrounds inner materials. Many dry toners used in electrophotography have a ferrite particle as the inner-most material. This particle is typically encased or encapsulated in a polymer resin which may be further encapsulated by additional materials in several layers. Typically, all materials in these toners are solids or gels.

Microencapsulation results in a solid (hard or soft) shell material surrounding a solid, liquid or gas core material. Microcapsules refer to capsules which range from 1 to hundreds of microns in diameter. Nanocapsules refer to capsules which less than 1 micron in diameter. Microcapsules may include a capsule within another capsule, or several layers of shell material surrounding the core. Combinations of these configurations can be constructed.

The core material of the microcapsule is an ink 22 which includes pigments within a carrier fluid. For this invention, the ink 22 can have very high pigment concentrations. The carrier fluid can be water, oil or alcohol. However, oil is preferred because oil coats an outer surface of fibers within printed paper whereas water is absorbed into the fibers within printed paper which causes the printed paper to swell. The pigment concentrations can be very high. Therefore, the puddling problems associated with fast ink jet printing can be avoided. The colorant is a pigment in which the particle size of the pigment is small compared to conventional dry toners. The pigment particle size is typically less than 1 micron and preferably less than 0.1 micron.

Figure 3:
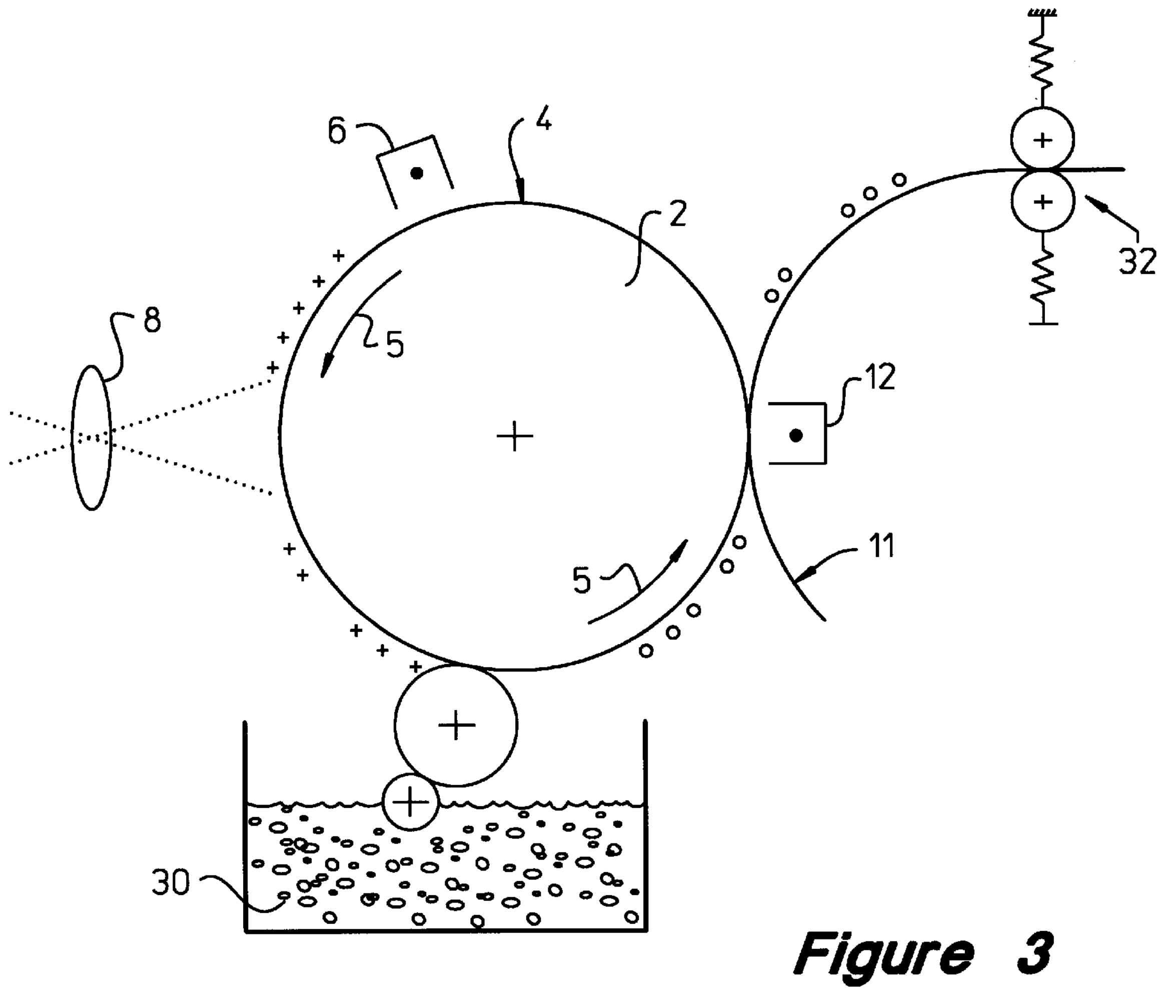
FIG. 3 shows an embodiment of a printer apparatus according to the invention.

FIG. 3 shows an embodiment of this invention. This embodiment is similar to FIG. 1 except the heat fuser 14 of FIG. 1 has been replaced with a pressure fuser assembly 32 and the charged dry toner has been replaced by charged microcapsules 30. The advantage of this arrangement is that the color quality of the images printed is significantly better than the color quality of images printed by conventional laser printers. However, the speed of laser printers can still be maintained. The pressure fuser assembly 32 crushes the microcapsules which have been deposited on the paper 11 which releases the ink within the microcapsules onto the paper 11. The released ink forms the image on the paper 11. No warm-up period is required because the pressure fuser assembly 32 does not require the warm-up period that a heat fuser requires. Furthermore, unlike the heat fuser, the pressure fuser assembly 32 does not dissipate power the entire time that the printer is powered.

Oil and pigment particles are released on the print medium when the microcapsules are burst. If the print medium is conventional cellulose paper, the oil and pigment particle spread onto the fibers of the paper in the immediate vicinity of the ruptured capsules. The pigment particles tend to remain on the surface of the paper while the oil tends to penetrate the paper to a given depth and coat an outer surface of the fibers of the paper. If printing on transparent film, both the oil and the pigment remain on the surface because the transparent film is not porous. In either case, the oil dries and hardens by oxidation due to exposure to air.

The microcapsules can contain drying agents or reactive chemicals to speed the process of oxidation or curing of the oil. The drying agents or reactive chemicals are activated when the capsules are burst. The drying agents are typically alcohol. Reactive chemicals can include two reactive components similar in behavior to a catalyst and resin component of two-part epoxies.

Figure 4:
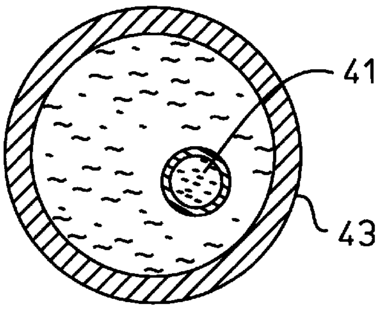
FIG. 4 show a microcapsule within another microcapsule.

Various method can be used to mix the reactive chemicals which speed the oxidation or curing of the oil released from the microcapsules. In one embodiment, two types of microcapsule are transferred to a print medium. The first type of microcapsule includes a catalyst component within the oil and ink mixture within the microcapsule. The second type of microcapsule includes a resin component within the oil and ink mixture within the microcapsule. When the two types of microcapsules are simultaneously crushed, the contents of each type of microcapsule mix as the contents of each are released onto the print medium. The contents of the two types of microcapsules react to harden or cure the oil within the mixture. An alternative embodiment is shown in FIG. 4 and includes a smaller capsule 41, possibly a nanocapsule, contained within each microcapsule 43. The smaller capsule 41 located within the microcapsule 43 can contain the catalyst, while the larger microcapsule 43 can contain the resin counterpart within the carrier oil. Crushing the larger microcapsule 43 results in the smaller inner capsule 41 being crushed at the same time and in the same location. Therefore, the contents of the microcapsule 43 mix with the contents of the inner capsule 41. The reactive component mixtures described have been well developed in the art of microencapsulation and have been used to produce premixed epoxies and adhesives. It should be understood that reactive mixtures of more than two components can be developed.

Figure 5:
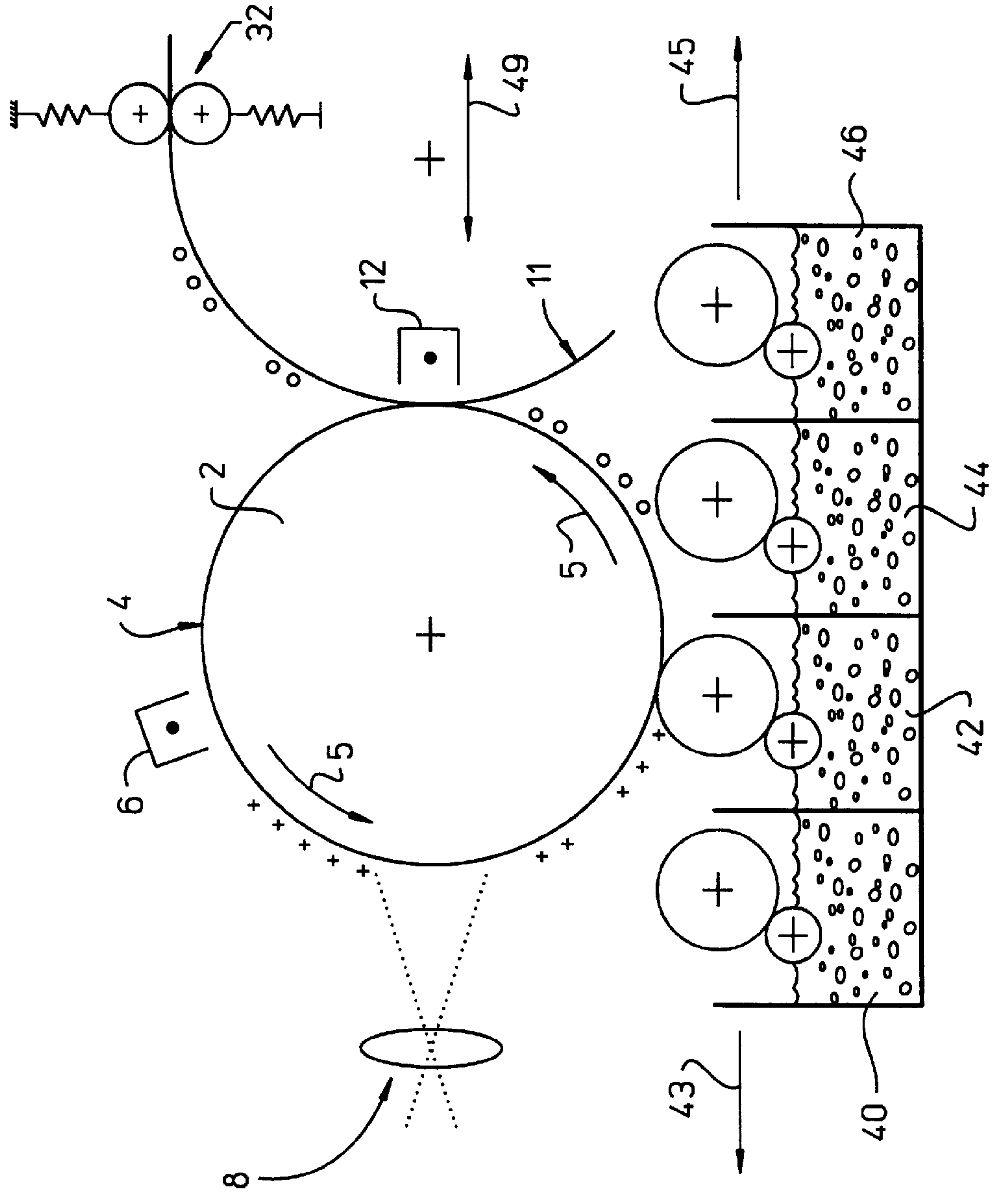
FIG. 5 shows another embodiment of the invention including multiple colors of ink filled microcapsules.

FIG. 5 shows another embodiment of this invention. This embodiment provides microcapsules which contain multiple colors of ink. The different types of microcapsules 40, 42, 44, 46 each contain liquid ink of a different color. The microcapsules 40, 42, 44, 46 are transferred serially to the discharged regions of the photoconductive surface 4 as the photoconductive surface 4 is sequentially charged and image discharged for each color. The microcapsules 40, 42, 44, 46 are transferred to the paper 11 in substantially the same way as the microcapsules 30 of FIG. 3. In this configuration, however, developer assemblies holding the microcapsules 40, 42, 44, 46 are shifted back and forth according to the arrows 43, 45 so that only one color of microcapsule is transferred at a time. Similar to FIG. 3, the microcapsules transferred to the piece of paper 11 are crushed by a fuser 32. The colored microcapsules 40, 42, 44, 46 are only deposited on the print medium 62 specifically where ink within the microcapsules 40, 42, 44, 46 is to be released onto the print medium 62 after being crushed. That is, the microcapsules are deposited in a color-specific image-wise pattern. The print medium 62 is moved away from the photoconductive surface 4 as depicted by arrow 49 while the colored microcapsules are being deposited on the photoconductive surface 4. After all of the colored microcapsule within as image have been deposited on the photoconductive surface 4, the print medium 11 is moved into contact with the photoconductive surface 4. A similar multiple color configuration is used in existing laser printers which print multiple colors.

Figure 6:
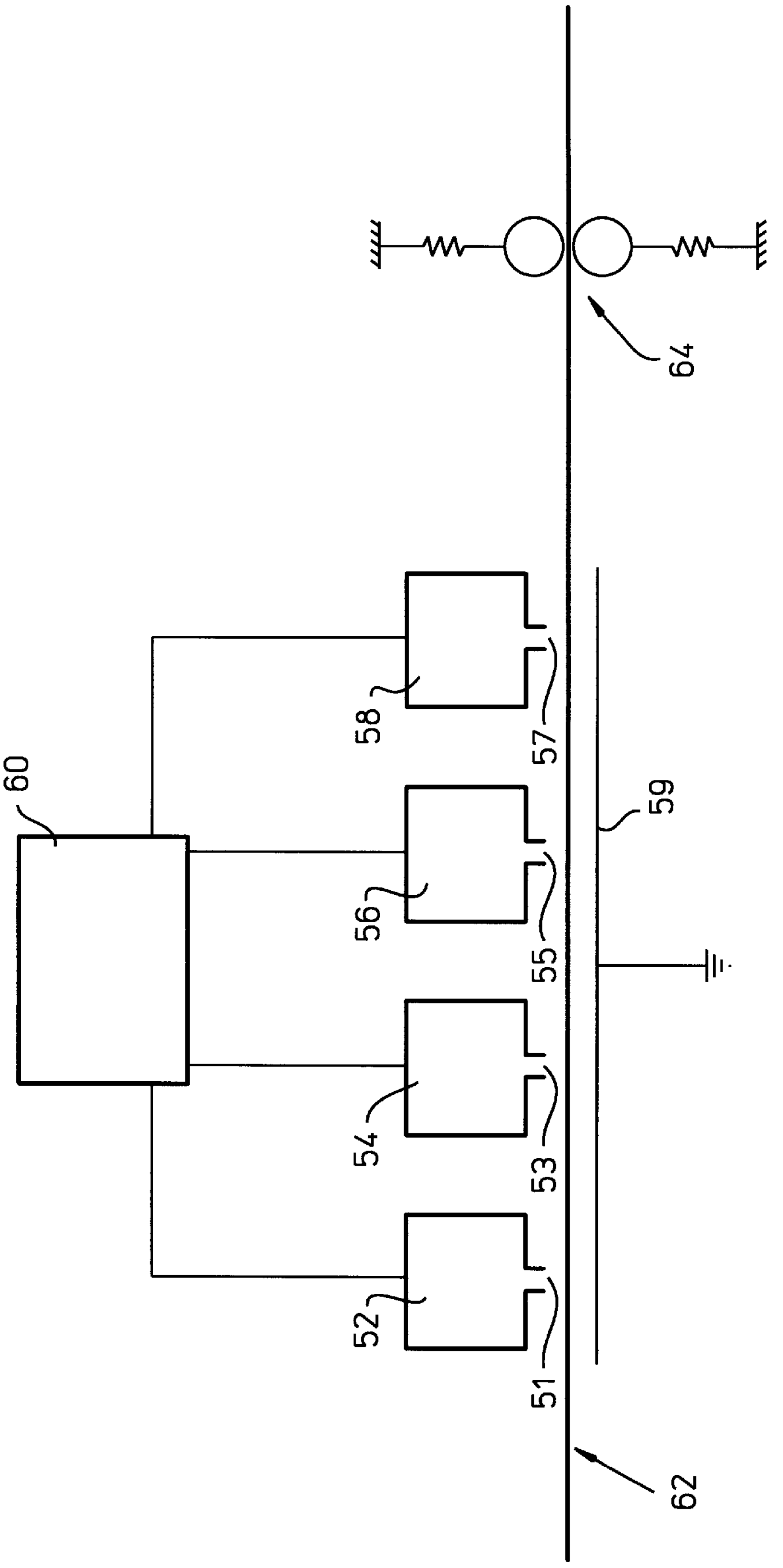
FIG. 6 shows another embodiment of the invention in which a toner ejection printing system is used to deliver the ink filled microcapsules.

FIG. 6 shows another embodiment of this invention in which microcapsules are deposited on a print medium through a toner ejection process. In this embodiment, charged microcapsules are contained within a plurality of chambers 52, 54, 56, 58. The charged microcapsules are naturally attracted to a ground plane 59. Each chamber contains charged microcapsules filled with a different color of ink. Each of the chambers have a nozzle 51, 53, 55, 57 which control the flow of the charged microcapsules out of the chambers 50, 52, 54, 56 to the ground plane 59. A controller 60 controls the nozzles 51, 53, 55, 57 and thereby controls the flow of the microcapsules being released from the chambers 50, 52, 54, 56. This configuration of nozzles and controller is well known in the art of toner rejection printing. A print medium 62 on which an image is to be formed is passed between the nozzles 51, 53, 55, 57 of the chambers 50, 52, 54, 56 and the ground plane 59. The released microcapsules are deposited on the print medium 62. The print medium 62 is transported through a pressure fuser 64 which crushes the microcapsules thereby releasing the ink within the microcapsules onto the surface of the print medium 62. The controller selectively controls the release of the colored microcapsules so that the microcapsules are only deposited on the print medium 62 specifically where the ink within the microcapsules is to be released onto the print medium 62 after being crushed. That is, the microcapsules are deposited in a color-specific image-wise pattern.

Figure 7:
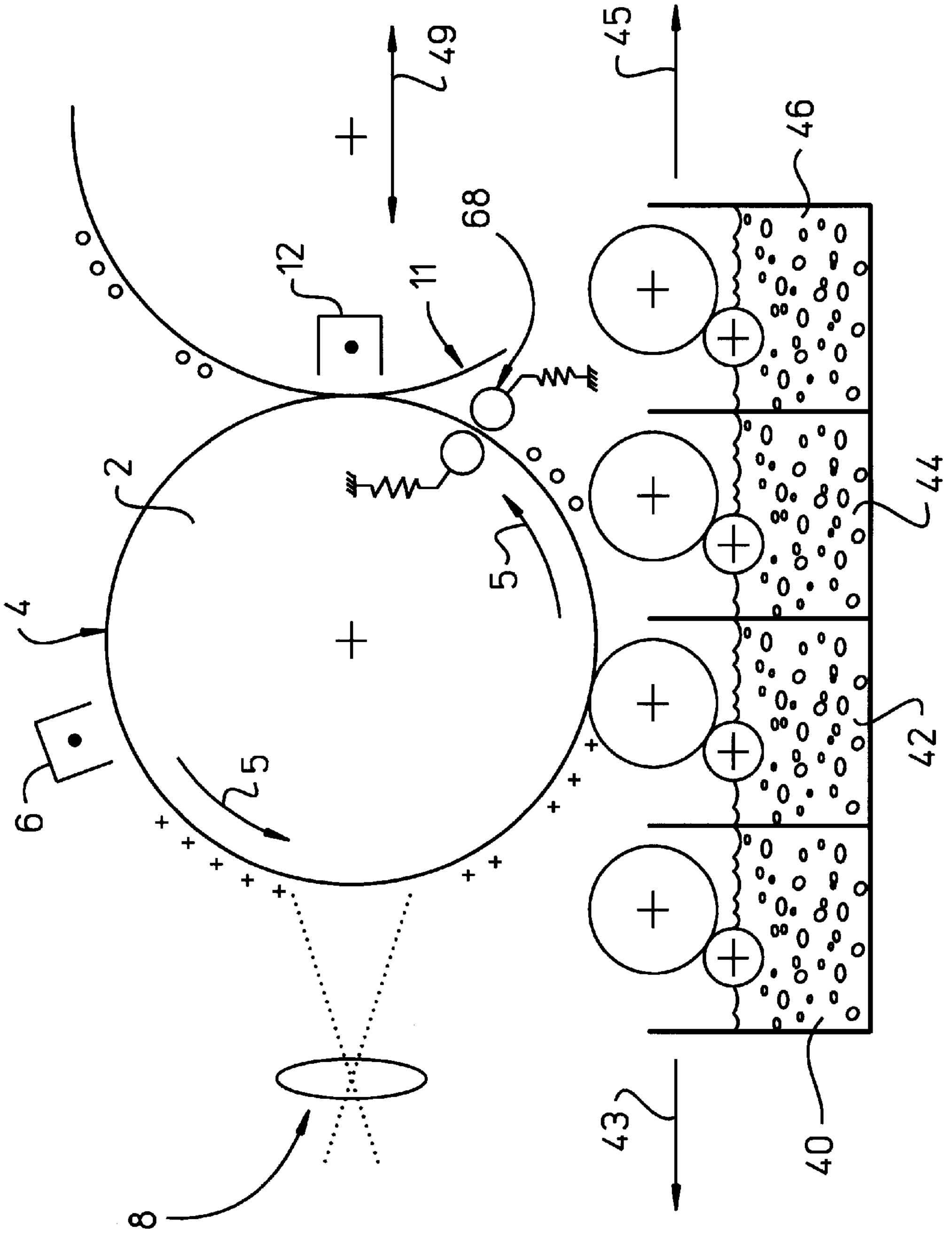
FIG. 7 shows another embodiment of the invention in which the microcapsules are crushed on the photoconductor before being transferred to the print medium.

FIG. 7 shows another embodiment of this invention in which the microcapsules are crushed by a pressure fuser 68 on the photoconductive surface 4 before being transferred to the print medium 11. In this embodiment, the cores of the microcapsules contain charged pigment particles suspended in an oil similar to the toner of liquid electrophotographic (LEP) systems but with much higher colorant content of about 20%–30%. Liquid born toner particles can be transported by electrophoresis and are attracted to sharply defined charge/discharge patterns (exposure pattern) on the photoconductive surface 4. The sharp definition of the exposure pattern results in an effectively higher edge contrast which enhances print resolution. Dry microcapsules (containing liquid born charged particles) accumulate on the photoconductive surface 4 much like dry toner particles of an equivalent size. However, the liquid contents of the microcapsules are released when the microcapsules are crushed. The charged pigment particle within the liquid which are released outside the exposure region move electrophoretically toward the exposure pattern.

Dry toner particles having the same charge repel each other. However, dry toner particles having the same charge are all attracted to regions of the photoconductive surface 4 having a charge opposite to the charge on the particles. As dry toner particles accumulate at the discharged regions of the photoconductive surface 4, the particles tend to scatter about the discharged regions because the individual particles repel each other. The result is that the printed image can be blurred. This phenomena does not occur with this embodiment of the invention because the particles within the liquid toner are so small that the interaction between particles is negligible. That is, the relative distance between the particles is large in comparison to the size of the particles. In addition, the liquid toner wets the surface of the photoconductive surface which tends to keep the particles from scattering but allows electrophoretic motion.

Figure 8:
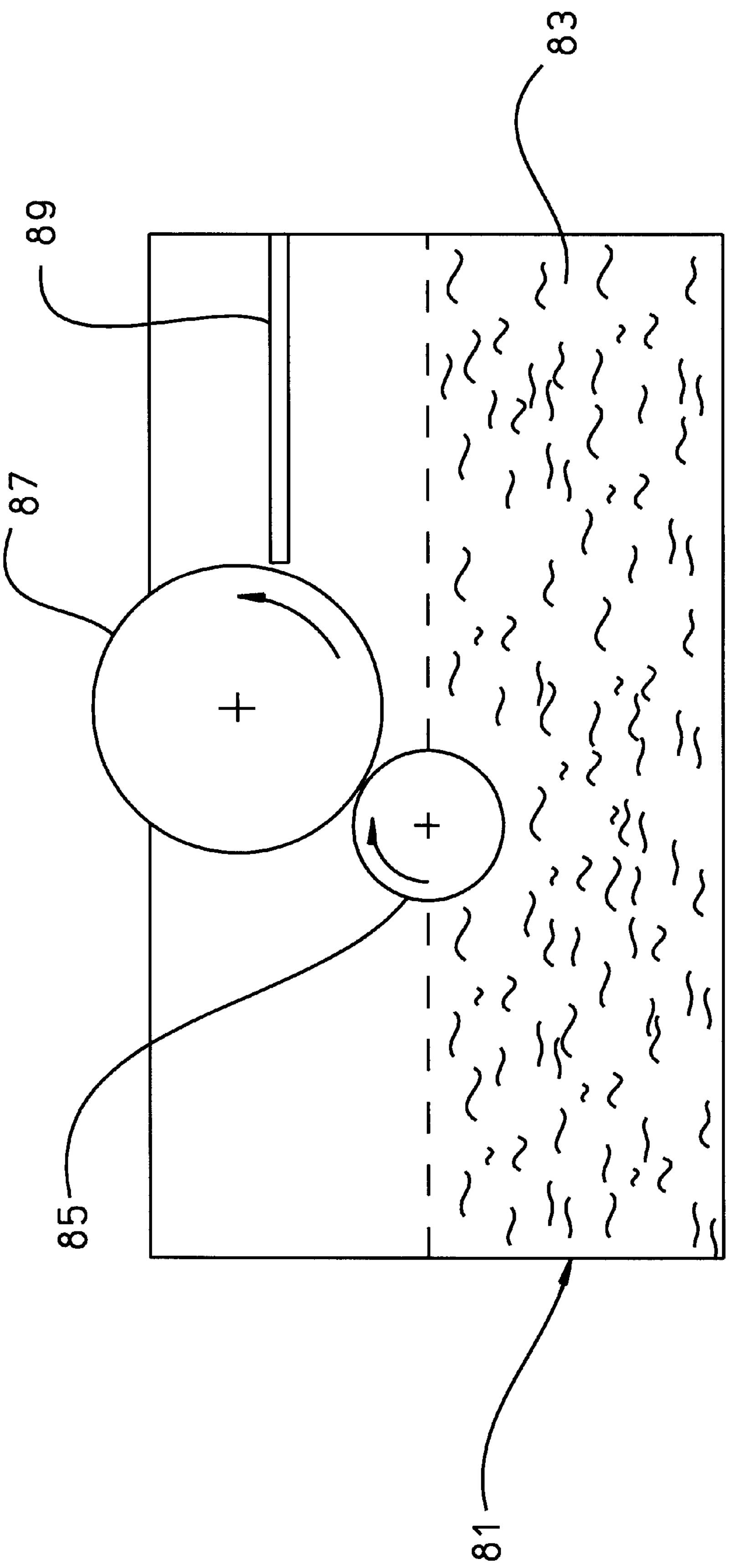
FIG. 8 shows a toner cartridge which contains the microcapsules of the invention.

FIG. 8 shows a refillable toner cartridge 81 of the invention. The refillable toner cartridge 81 is a reservoir which contains a supply of microencapsulated liquid ink toner particles 83. The toner cartridge 81 generally contains various rollers and blades for the purpose of tribocharging the microcapsules 83 and evenly transferring the microcapsules 83 to a photoconductive surface. FIG. 8 shows a supply roller 85, a developer roller 87 and a metering blade 89. Tribocharging is accomplished by a gentle rubbing action of the rollers against the microcapsules 83 and another surface which is either stationary or moving at a different speed or direction. The toner cartridge 81 generally provides a means for driving (turning) the rollers 85, 87 at a desired speed and a means for applying an electric potential to the rollers 85, 87 to assist in transporting the toner capsules. Some cartridges also contain the photoconductor. To minimize the cost of the cartridge, the minimum number of elements required to tribocharge the microcapsules 83 are included within the cartridge 81.

Chemical components can be included within the microcapsules to allow pigment particles to bond to paper fibers or transparency film resin to prevent smudging. However, the methods of this invention are not limited to paper and transparency film. The methods of this invention can be extended to cloth, glass, metal and other types of print medium.

Generally, presently existing laser printing technologies require heat fusers. As previously mentioned, the heat fusers transfer energy to the print medium after ink has been deposited on the print medium. Print speed can be limited by the rate at which heat can be transferred to the print medium. The embodiments of this invention do not include heat fusers. Therefore, the embodiments of this invention may print faster than presently existing laser printers.

Although specific embodiments of the invention have been described and illustrated, the invention is not to be limited to the specific forms or arrangements of parts so described and illustrated. The invention is limited only by the claims.

What is claimed is:

1. A printing system comprising:

a plurality of microcapsules;

each microcapsule comprising:

a dry outer shell; and a mixture of pigment particles and drying agents suspended within an ester oil, the mixture contained within the dry outer shell;

deposit means for depositing the microcapsules in a color-specific image-wise pattern on a print medium; and a pressure fuser assembly for crushing the microcapsules deposited on the print medium thereby releasing the mixture within the microcapsules on the print medium.

2. A printing system comprising:

a plurality of microcapsules;

each microcapsule comprising:

a dry outer shell comprising a firm dry wall material, wherein the wall material is a urea resorcinol formaldehyde material which can carry an electrostatic charge and can be crushed when a force is applied; and a mixture of pigment particles and drying agents suspended within a liquid oil, the mixture contained within the dry outer shell;

deposit means for depositing the microcapsules in a color-specific image-wise pattern on a print medium; and a pressure fuser assembly for crushing the microcapsules deposited on the print medium thereby releasing the mixture within the microcapsules on the print medium.

* * * * *